April 22, 1924.
R. G. BRINDLE
1,491,026
METHOD OF AND APPARATUS FOR EVAPORATING LIQUID SUBSTANCES
Filed Oct. 11, 1918
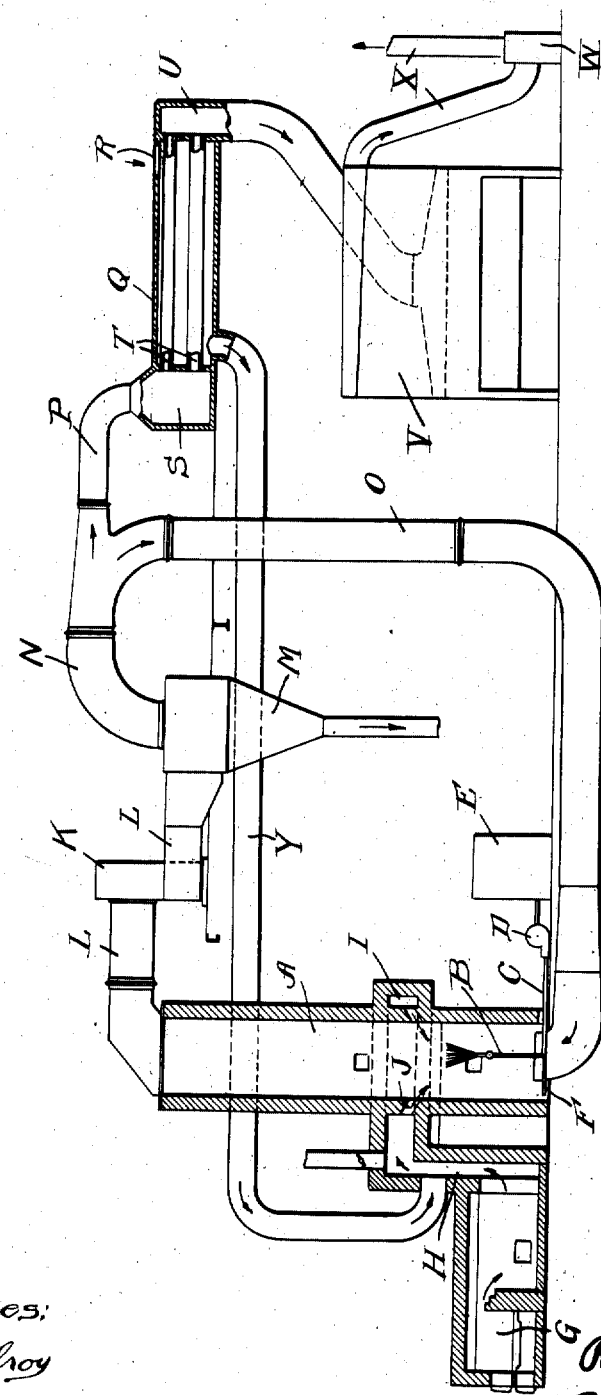

Patented Apr. 22, 1924.

1,491,026

UNITED STATES PATENT OFFICE.

RICHARD GUY BRINDLE, OF CHICAGO, ILLINOIS, ASSIGNOR TO CORN PRODUCTS REFINING COMPANY, A CORPORATION OF NEW JERSEY.

METHOD OF AND APPARATUS FOR EVAPORATING LIQUID SUBSTANCES.

Application filed October 11, 1918. Serial No. 257,770.

*To all whom it may concern:*

Be it known that I, RICHARD G. BRINDLE, a citizen of the United States, residing at Chicago, in the county of Cook and State of Illinois, have invented certain new and useful Improvements in Methods of and Apparatus for Evaporating Liquid Substances, of which the following is a specification.

My invention relates to the evaporation of liquids, for example, solutions or liquids containing solid substances in suspension, and the object of the invention, generally speaking, is to provide certain improvements in this art whereby the operations of evaporating the liquid and collecting the resulting dry substances may be accomplished more effectively and economically and with a smaller outlay for apparatus than is possible with the methods now employed.

The invention has in view particularly the economizing of fuel by the employment of arrangements for re-using continuously, a considerable portion of the heated air outflowing from the evaporation chamber. The invention also provides a novel system of collecting the dried material which permits the use of small, simple, and relatively cheaply constructed dust collectors without loss of any appreciable part of the output. Other incidental objects will appear from the following description of the invention.

A suitable apparatus embodying the improvements constituting the invention is shown in the accompanying drawing which illustrates the apparatus in side elevation with parts in section, the drawing being diagrammatic in some respects.

Referring to the drawing, A represents an evaporating chamber within which is arranged an atomizing spray nozzle B, of any desired type, which is supplied with liquid through pipe C in which is arranged a pump D, the liquid being drawn from a supply vessel E. F is a pipe for supplying air under pressure to nozzle B. G is an air heating device, preferably a furnace connected by a flue H with a circumferential duct I surrounding the evaporating chamber. The air heated in furnace G passes through flue H and duct I and into the evaporation chamber through tuyères J. The air comes in contact with the spray from nozzle B at some distance above the point at which the liquid issues from the nozzle.

The air, vapor and dry particles are withdrawn from the top of chamber A by a fan K through a duct L into a dust collector M, preferably of the cyclone type. The bulk of the dry material from the evaporating operation is discharged from the apparatus at this point. The air from the dust collector M passes into a pipe N which has two branches, branch O leading back to the bottom of the evaporating chamber under the spray nozzle B, and branch P to a heat transfer device Q through which is circulated fresh air taken in through an opening R. The air and suspended particles from pipe P pass into a header S through pipes T and into a header U; all forming part of the heat transferring device, and thence into a dust collector V which may be a bag collector of any desired construction. The air is drawn from dust collector V by a fan W in the outlet pipe X. The fresh air passing through the heat transferring device Q is heated to a certain extent and passes through a pipe Y to the flue H between furnace G and the evaporating chamber.

The velocity of the air and gases passing through the desiccating chamber is sufficient to carry over all the solid particles.

With the apparatus constructed as shown and described it is possible to evaporate liquids in a very economical manner. The method of treatment which the invention provides is especially economical in working with high temperatures, for the purpose, for example, of producing chemical changes in the substances treated as well as reducing the same to a dry state. There is very little heat wasted with the exception of inevitable radiation losses. By means of the furnace the air entering duct H may be heated to a high temperature. This temperature will be considerably reduced by the introduction of the air which is taken from the atmosphere and only moderately heated in the heat transferring device Q. The bulk of the dry material is separated out by the cyclone dust collector M. The portion of the air from the dust collector which is returned immediately to the evaporation chamber through pipe O serves to produce an initial drying or evaporation of the liquid treated. The heated air introduced through the tuyères J, which will be at a higher temperature than the air introduced into the evaporation chamber through pipe O, completes the drying operation and gives the material the relatively high temperature necessary for producing chemical changes therein when the intended treatment involves such chemical changes. If the air passing through pipe O contains particles in suspension, as will be the case to some extent, such particles are mixed with the spray and consequently are not lost.

It is not possible to return all of the air from the evaporation chamber back to said chamber as the air in the apparatus would, in such case, eventually become saturated and the evaporation of liquid cease. A certain portion of the air passing through duct N is, therefore, discharged into the atmosphere. It first passes, however, through the heat transferring device Q where most of its heat is given up to the fresh and relatively dry air drawn in through opening R. It is then passed through the bag dust collector V in which a separation is made between air and substantially all of the dry particles suspended therein. The bag dust collectors are effective and can be counted upon to make a very complete separation, but they are somewhat expensive to install and maintain. By the arrangement shown only a comparatively small part of the air drawn from the evaporating chamber passes through the bag collector V, just enough, in fact, to keep the percentage of moisture in the apparatus constant, and consequently the collector V may be comparatively small. While the separation made by the cyclone collector M may not be very complete, this is of small consequence because of the air issuing from this dust collector a part goes to dust collector V and the rest back to the evaporation chamber.

Although the heated air passing through the heater Q is lowered in temperature, it is not sufficiently lowered to bring it to a point of saturation so that moisture would be considered within the heater. At the temperature to which the air and gases are originally heated, the gases are capable of absorbing considerably more moisture than they carry out of the evaporating or desiccating chamber. In other words, the gases are by no means saturated.

The fresh air drawn through the heat transferring device Q serves to substantially reduce the temperature of the air entering the tuyères J. It will be found economical to maintain a hot fire in the furnace G and to then reduce the temperature of the air and products of combustion issuing from the furnace before they go to the evaporation chamber. The temperature maintained in the evaporation chamber will, of course, depend upon the character of the material treated and the nature of the changes to be produced therein.

While I have referred to the drying medium as air, and for the sake of economy I prefer to employ air as the drying agent, it will involve no departure from my invention to employ another gas in place of air.

I claim:

1. In apparatus of the character described, the combination of an evaporation chamber, means for spraying liquid therein, an air heater, means for introducing air into the evaporation chamber through said air heater, a heat transferring device separate from said air heater, means for causing a draft of fresh air other than the air heated in said air heater to pass through said heat transferring device and into the evaporation chamber, and means for causing heated air from the evaporation chamber to pass through the heat transferring device; said heat transferring device having separate ducts for said fresh air and air taken from the evaporation chamber.

2. In apparatus of the character described, the combination of an evaporation chamber, means for spraying liquid therein, an air heater, means for introducing air into the evaporation chamber through said air heater, a heat transferring device separate from said air heater, means for causing a draft of fresh air other than the air heated in said air heater to pass through said heat transferring device and into the evaporation chamber, means for causing heated air from the evaporation chamber to pass through the heat transferring device; said heat transferring device having separate ducts for said fresh air and air taken from the evaporation chamber, and a dust collector through which the air from the evaporation chamber is passed after it leaves the heat transferring device.

3. In apparatus of the character described, the combination of an evaporation chamber, means for spraying liquid therein, means for introducing heated air into the chamber, means for returning part of the air drawn from the evaporation chamber back to the chamber, a heat transferring device, means for causing another part of the air from the chamber to pass through the heat transferring device, and means for causing fresh air to be introduced into and pass through the heat transferring device, out of contact with said air from the evaporation chamber, and thereafter to be introduced into said evaporation chamber.

4. In apparatus of the character described, the combination of an evaporation chamber, a spray nozzle in the chamber, means for introducing heated air into the chamber in contact with the sprayed liquid at a place beyond the spray nozzle, means for returning part of the air drawn from the evaporation chamber back to the chamber in contact with the liquid as it issues from the spray nozzle, a heat transferring device through which fresh air and the other part of the air from the evaporation chamber is circulated, and means for introducing the fresh air when heated in said device into the chamber with the air first mentioned so as to reduce the temperature thereof.

5. In apparatus of the character described, the combination of an evaporation chamber, a spraying device therein, an air heating device having a duct leading to the evaporation chamber, a heat transferring device through which fresh air is adapted to circulate, a duct leading from the evaporation chamber to said heat transferring device, a dust collector through which the air from the evaporation chamber is passed after leaving the heat transferring device, and a duct through which fresh air from the heat transferring device is passed to said first mentioned duct.

6. In apparatus of the character described, the combination of an evaporation chamber, a spraying device therein, an air heating device having a duct leading to the evaporation chamber, a heat transferring device through which fresh air is adapted to be circulated, a duct leading from the evaporation chamber to said heat transferring device, a dust collector through which the air from the evaporation chamber is passed after leaving the heat transferring device, a duct through which fresh air from the heat transferring device is passed to said first mentioned duct, and a duct through which a part of the air from the evaporation chamber is returned to the evaporation chamber without passing through the heat transferring device.

7. In apparatus of the character described, the combination of an evaporation chamber, a spray nozzle in the bottom of the evaporation chamber for spraying the liquid to be treated upwardly through the chamber, a duct surrounding the evaporation chamber above the spray nozzle adapted to receive air from said air heating device and having ports to deliver said air into the chamber, a dust collector, and means for withdrawing air from the top of the chamber into said dust collector, a heat transferring device having a passage for the circulation therethrough of fresh air, and a passage for air drawn from the evaporation chamber, a duct connecting said dust collector with said last named passage, a branch duct leading from said last named duct to the bottom of the evaporation chamber, a dust collector through which air from the evaporation chamber is passed after circulating through the heat transferring device, and a duct for introducing the fresh air circulated through the heat transferring device into the duct surrounding the evaporation chamber.

8. Method of treating liquids which comprises spraying the liquid into an enclosed space, introducing heated air into said space so that it will come into contact with the material at a place beyond the place where the material issues from the spraying means, withdrawing the air and suspended particles from said space, separating the solid material from the air so withdrawn, discharging a part of said air and returning the rest of it to the said enclosed space in contact with the material as it issues from the spraying means.

9. Method of treating liquids which comprise spraying the liquid into an enclosed space, introducing heated air into said space so that it will come into contact with the material at a place beyond the place where the material issues from the spraying means, withdrawing the air and suspended particles from said space, making a partial separation of the solid substances from the air, subjecting a part of said air to a further separating operation, discharging the same to the atmosphere, and returning the rest of the air without further separation of solids to the said enclosed space in contact with the material as it issues from the spraying means.

RICHARD GUY BRINDLE.